US012659039B2

(12) United States Patent
    Kawai

(10) Patent No.: US 12,659,039 B2
(45) Date of Patent: Jun. 16, 2026

(54) GAIN EQUALIZATION APPARATUS AND METHOD FOR EQUALIZING GAIN

(71) Applicant: NEC Corporation, Tokyo (JP)

(72) Inventor: Motoyoshi Kawai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 321 days.

(21) Appl. No.: 18/283,106

(22) PCT Filed: Jan. 17, 2022

(86) PCT No.: PCT/JP2022/001398
    § 371 (c)(1),
    (2) Date: Sep. 20, 2023

(87) PCT Pub. No.: WO2022/201778
    PCT Pub. Date: Sep. 29, 2022

(65) Prior Publication Data
    US 2024/0171282 A1     May 23, 2024

(30) Foreign Application Priority Data

Mar. 24, 2021    (JP) ................................. 2021-050010

(51) Int. Cl.
    H04B 10/294        (2013.01)
    H04B 10/40         (2013.01)
    H04B 10/50         (2013.01)

(52) U.S. Cl.
    CPC ........... H04B 10/294 (2013.01); H04B 10/40 (2013.01); H04B 10/50 (2013.01)

(58) Field of Classification Search
    None
    See application file for complete search history.

(56) References Cited

U.S. PATENT DOCUMENTS 6,144,474 A * 11/2000 Nitta ................... H04J 14/0213
                                                    398/1
6,614,586 B2 * 9/2003 Hayee ................. H04J 14/0224
                                                    359/334
(Continued)

FOREIGN PATENT DOCUMENTS

JP      H11-224967 A      8/1999
JP      2001-094534 A     4/2001
(Continued)

OTHER PUBLICATIONS

International Search Report for PCT Application No. PCT/JP2022/001398, mailed on Apr. 5, 2022.
(Continued)

*Primary Examiner* — Darren E Wolf
(74) *Attorney, Agent, or Firm* — Sughrue Mion, PLLC

(57)        ABSTRACT

A gain equalization apparatus according to an example embodiment includes a first path including a gain equalizer configured to correct a tilt of an input optical signal, a second path including a through-fiber configured to transmit the input optical signal therethrough as it is, an optical switch capable of switching between the first path including the gain equalizer and the second path including the through-fiber, at least one memory configured to store instructions, and at least one processor configured to execute the instructions to control the switching of the optical switch. By this configuration, a gain equalization apparatus and a method for equalizing a gain capable of reducing power consumption and suppressing an increase in optical loss while improving reliability are provided.

6 Claims, 4 Drawing Sheets

(56)          References Cited

U.S. PATENT DOCUMENTS

| | | | |
|---|---|---|---|
| 2002/0041433 A1* | 4/2002 | Terahara ............. | H01S 3/10023 |
| | | | 359/337.1 |
| 2002/0054747 A1* | 5/2002 | Foley ...................... | G06F 1/187 |
| | | | 385/134 |
| 2003/0031433 A1* | 2/2003 | Feinberg ............. | H04J 14/0227 |
| | | | 385/100 |
| 2008/0151377 A1* | 6/2008 | Sekine ............... | H04B 10/2525 |
| | | | 359/615 |
| 2011/0318021 A1* | 12/2011 | Zhou ................... | H04L 27/0014 |
| | | | 375/376 |
| 2020/0403701 A1 | 12/2020 | Tanehashi | |
| 2021/0058684 A1* | 2/2021 | Inada ................. | H04Q 11/0005 |

FOREIGN PATENT DOCUMENTS

| | | |
|---|---|---|
| JP | 2008-154123 A | 7/2008 |
| WO | 2019/167736 A1 | 9/2019 |
| WO | 2019/176894 A1 | 9/2019 |

OTHER PUBLICATIONS

Jose Chesnoy, Undersea Fiber Communication Systems, 432-435pp, 2nd Edition, 2015.

\* cited by examiner

Figure 2:
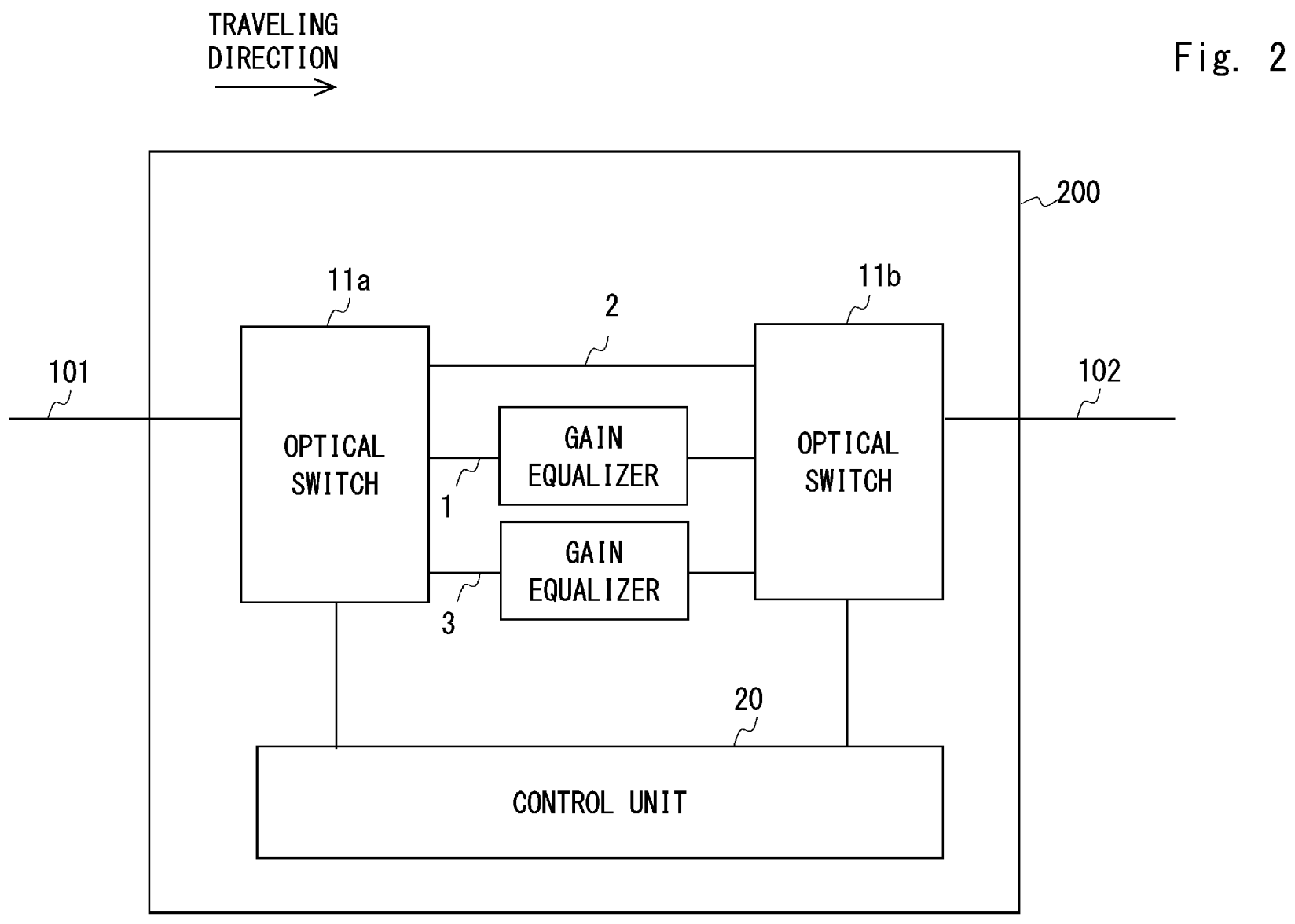

TRAVELING DIRECTION →

200

102

101

11a OPTICAL SWITCH

11b OPTICAL SWITCH

2

1 GAIN EQUALIZER

3 GAIN EQUALIZER

20 CONTROL UNIT

Fig. 3

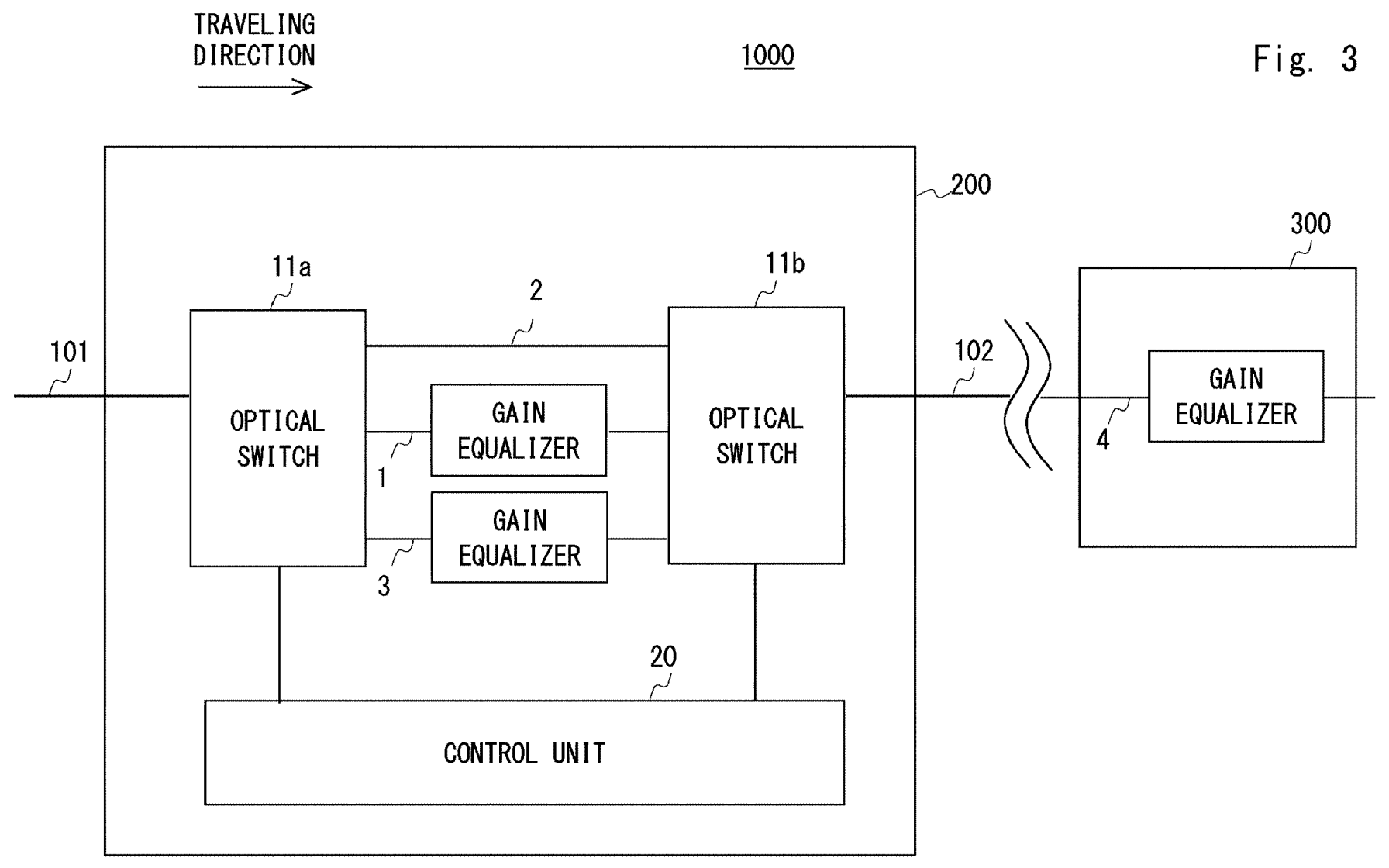

TRAVELING DIRECTION →

1000

200

300

101

102

11a OPTICAL SWITCH

11b OPTICAL SWITCH

2

1 GAIN EQUALIZER

3 GAIN EQUALIZER

4 GAIN EQUALIZER

20 CONTROL UNIT 100, 200, 300

GAIN EQUALIZATION APPARATUS AND METHOD FOR EQUALIZING GAIN

This application is a National Stage Entry of PCT/JP2022/001398 filed on Jan. 17, 2022, which claims priority from JP Patent Application 2021-050010 filed on Mar. 24, 2021, the contents of all of which are incorporated herein by reference, in their entirety.

TECHNICAL FIELD

The present invention relates to a gain equalization apparatus and a method for equalizing a gain. In particular, the present invention relates to a gain equalization apparatus and a method for equalizing a gain used in a submarine communication system.

BACKGROUND ART

In optical submarine cable systems, it is necessary to ensure the transmission quality of optical signals transmitted over a long distance. Specifically, it is necessary to keep each signal level of WDM (Wavelength Division Multiplexing) signal (hereafter also referred to as an optical signal) within a certain range in order to ensure the transmission quality.

Meanwhile, when the submarine cable system is continuously operated, the overall optical loss in the submarine cable system will increase as a result of the increment of the optical loss in an optical fiber itself over time with the deterioration of the submarine cable due to aging and the like, and a result of the insertion of an alternative cable when an optical fiber of a cable is broken due to some reason. Consequently, an input level to an optical amplifier used in a repeater decreases more than expected, so that unevenness for each wavelength of the WDM signal increases and tilt (i.e., slope or inclination) therefor also increase. As a result, there is a problem that the required transmission quality cannot be obtained.

To cope with this problem, for example, there is a method for correcting the uneven shape and the tilt for each wavelength of the WDM signal by using an optical filter device (a gain equalizer) as disclosed in Non-patent Literature 1. Further, for example, there is a method for compensating a tilt level by using an equalization apparatus disclosed in Patent Literature 1. Further, when an optical loss in a submarine cable system increases even when a gain equalization apparatus is used, a method for pulling up the gain equalization apparatus from the seabed and replacing an optical filter or adding a new repeater is used. As another method, there is a method in which a wavelength selective switch device (WSS; wavelength selective switch) is laid on the seabed, and a level difference of WDM signals is adjusted by changing the profile of the WSS.

CITATION LIST

Patent Literature

Patent Literature 1: International Patent Publication No. WO2019/167736

Non Patent Literature

Non-patent Literature 1: Jose Chesnoy, Undersea Fiber Communication Systems 2nd Edition, 2015

SUMMARY OF INVENTION

However, in the above-described method, there is a problem that it is necessary to pull up the gain equalization apparatus laid on the seabed from the seabed in order to replace an optical filter, and it is also necessary to pull up an already-laid submarine cable when a repeater is added, so that the cost for such work is large. Further, regarding the equalization apparatus disclosed in Patent Literature 1, it is necessary to perform complicated control; the optical loss is large; and as a prerequisite, a matrix switch having a complicated structure is used. Therefore, there is a problem that the size and power consumption of the apparatus are large.

Further, regarding the wavelength selective switch device, the reliability of the wavelength selective switch device itself is not satisfactory, and it is necessary to make the wavelength selective switch redundant in the apparatus. Therefore, there is a problem that the circuit of the gain equalization apparatus using the wavelength selective switch is complicated, and the size and power consumption thereof are also large.

In view of the above-described problems, an object of the present invention is to provide a gain equalization apparatus and a method for equalizing a gain capable of reducing the power consumption and suppressing the increase in the optical loss while improving the reliability.

A gain equalization apparatus according to an aspect of the present invention includes:

a first path including a gain equalizer configured to correct a tilt of an input optical signal;

a second path including a through-fiber configured to transmit the input optical signal therethrough as it is;

an optical switch capable of switching between the first path including the gain equalizer and the second path including the through-fiber; and a control unit configured to control the switching of the optical switch.

A method for equalizing a gain according to an aspect of the present invention includes:

performing a gain equalization process for correcting a tilt of an input optical signal for the input optical signal, and outputting the resultant signal; and outputting, in a predetermined case, the input optical signal as it is without performing the gain equalization process.

According to the present invention, it is possible to provide a gain equalization apparatus and a method for equalizing a gain capable of reducing the power consumption and suppressing the increase in the optical loss while improving the reliability.

BRIEF DESCRIPTION OF DRAWINGS

FIG. 1 is a block diagram showing a configuration of a gain equalization apparatus according to a first example embodiment;

FIG. 2 is a block diagram showing a configuration of a gain equalization apparatus according to a second example embodiment;

FIG. 3 is a block diagram showing a configuration of a gain equalization system according to a third example embodiment.

EXAMPLE EMBODIMENT

First Example Embodiment

Figure 4:
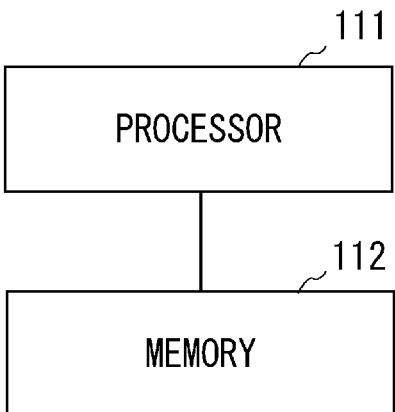
FIG. 4 is a block diagram showing a configuration of a control apparatus for a gain equalization apparatus according to the first to third example embodiments.

An example embodiment according to the present invention will be described hereinafter with reference to the drawings. However, the present invention is not limited to the below-shown example embodiment. Further, the following descriptions and drawings are simplified as appropriate for clarifying the explanation.

Figure 1:
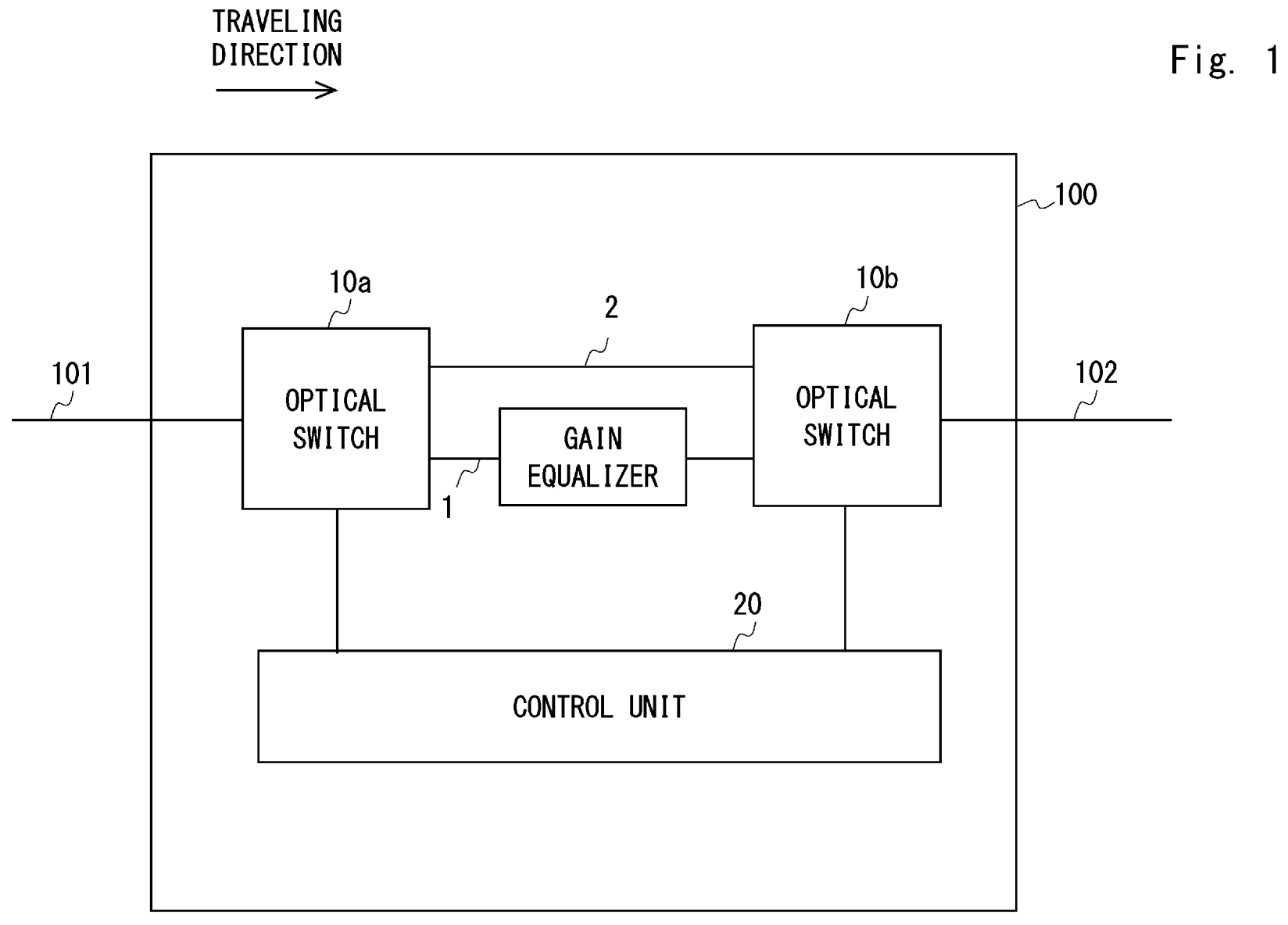

FIG. 1 is a block diagram showing a configuration of a gain equalization apparatus 100 according to a first example embodiment. The gain equalization apparatus 100 includes a first path 1 including a gain equalizer, a second path 2 including a through-fiber, an optical switch 10a, an optical switch 10b, and a control unit 20. For simplifying the explanation, the optical switches 10a and 10b are also referred to collectively as optical switches 10. The direction of an optical signal input to the gain equalization apparatus 100 is shown as a traveling direction in FIG. 1. The optical signal is input to the gain equalization apparatus 100 through an optical fiber 101 and output from the gain equalization apparatus 100 through an optical fiber 102.

The gain equalization apparatus 100 is an apparatus that is used in a submarine communication system and is laid on the seabed. Specifically, the gain equalization apparatus 100 is interposed between at least two of a plurality of repeaters that constitute a submarine cable system. That is, the gain equalization apparatus 100 is an apparatus that receives an optical signal from a repeater, corrects the tilt level of the input optical signal, and outputs the optical signal having the corrected tilt level to the next repeater. Note that the repeater is an apparatus that is laid on the seabed and amplifies an optical signal.

The first path 1 is a path including a gain equalizer that corrects the tilt (i.e., slope or inclination) of an input optical signal. The gain equalizer is manufactured based on the calculation of the attenuation characteristics of signals that is made based on conditions such as the wavelengths of the signals, the number, arrangement, and characteristics of optical amplifiers (repeaters), the length of the optical fiber, and the temperature at the seabed where the submarine cable is laid. The gain equalizer is designed so as to limit the level difference of WDM signals within a predetermined range. A known device can be used for the gain equalizer. The path between the optical switch 10a of the first path 1 and the gain equalizer and the path between the gain equalizer and the optical switch 10b can be formed by using optical fibers. When the input optical signal that passed through the first path 1 then passes through the gain equalizer, its uneven shape and tilt are corrected.

The second path 2 is a path including a through-fiber through which an input optical signal is transmitted as it is. The through-fiber is a fiber that causes an extremely small optical loss. That is, the input optical signal that passed through the second path 2 is output, through the through-fiber, to the optical fiber 102 through the optical switch 10b as it is without its uneven shape and tilt being corrected.

The optical switches 10 are switches that can switch the path between the first path 1 including the gain equalizer and the second path 2 including the through-fiber. The optical switch is a switch that can switch the path without converting the optical signal into an electric signal.

The optical switch 10a switches the path under the control of the control unit 20. For example, when a control signal for switching from the first path 1 to the second path 2 is transmitted from the control unit 20, the optical switch 10a switches the path from the first path 1 to the second path 2. Similarly, when a control signal for switching from the second path 2 to the first path 1 is transmitted from the control unit 20, the optical switch 10a may switch the path from the second path 2 to the first path 1. The optical switches 10 may be connected, as an initial setting, to the first path 1 including the gain equalizer that corrects the tilt of an input optical signal.

The optical switch 10b switches the path so that the path connected to the optical switch 10a is connected to the optical fiber 102. Specifically, when the optical switch 10a is outputting an input optical signal received from the optical fiber 101 to the first path 1, the optical switch 10b is connected to the first path 1 and hence outputs the optical signal received from the first path 1 to the optical fiber 102. When the optical switch 10a switches the path from the first path 1 to the second path 2, the optical switch 10b also switches the path from the first path 1 to the second path 2 in a similar manner. The switching of the optical switch 10a and that of the optical switch 10b are both controlled by the control unit 20. In this way, the gain equalization apparatus 100 can output the optical signal input from the optical fiber 101 to the optical fiber 102. Note that in the above description, although only the switching of the path from the first path 1 to the second path 2 by the optical switches 10 has been described, the switching of the path from the second path 2 to the first path 1 can be performed in a similar manner.

The control unit 20 controls the switching of the optical switches 10. The control unit 20 may be connected to the optical switches 10 through a wire or wirelessly. The control unit 20 transmits a control signal for switching the path to which the optical switches 10 are connected to the optical switches 10. The function of the control unit 20 is implemented, for example, by an information processing apparatus such as a computer or a microcomputer. Further, the control unit 20 may be a control circuit.

The control unit 20 may control the switching of the optical switches based on a command received from a land terminal station (Trunk station). For example, a receiving unit (not shown) of the control unit 20 may receive a command (a signal) from the land terminal station, and the control unit 20 may control the switching of the optical switches 10 based on the received command. Note that the land terminal station may measure a value(s) of the optical loss of the submarine cable system by using a measuring instrument.

For example, the gain equalization apparatus 100 switches the path from the first path 1 to the second path 2 based on an externally-received command (e.g., a command received from a land terminal station) when the optical loss in the submarine cable system is increasing or the gain equalizer has failed. In this way, the gain equalization apparatus 100 can suppress the increase in the optical loss.

Further, the gain equalization apparatus 100 may switch the path from the second path 2 to the first path 1 based on an externally-received command (e.g., a command received from a land terminal station). For example, when the increase in the optical loss of the submarine cable system is solved, the gain equalization apparatus 100 can correct the tilt of the optical signal by switching the path from the second path 2 to the first path 1 and thereby using the first path 1.

Further, the gain equalization apparatus 100 may include a measuring instrument (not shown) capable of measuring the value(s) of the optical loss in the submarine cable system. The control unit 20 may automatically switch the optical switches 10 when, for example, the increase in the optical loss measured by the measuring instrument is equal to or larger than a predetermined threshold. The control unit 20 may switch the path from the first path 1 to the second path 2 when, for example, the increase in the optical loss measured by the measuring instrument is equal to or larger than a predetermined threshold. In this way, the gain equalization apparatus 100 can suppress the increase in the optical loss.

Next, the operation of the gain equalization apparatus 100 will be described. The gain equalization apparatus 100 performs, for an input optical signal, a gain equalization process for correcting the tilt of the input optical signal and outputs the resultant signal, and outputs, in a predetermined case, the input optical signal as it is without performing the gain equalization process. By using the above-described the method for equalizing a gain, it is possible to suppress the increase in the optical loss in the submarine cable system.

Note that the predetermined case is, for example, when a command indicating that the gain equalization process should not be performed has been received from the land terminal station. Specifically, the predetermined case is when a command related to the switching of optical switches (e.g., a command related to the switching from the first path 1 to the second path 2) has been received from the land terminal station. Further, the predetermined case may be when the input optical signal satisfies a predetermined condition(s), or when the increase in the optical loss is equal to or larger than a predetermined threshold.

Operations performed by the gain equalization apparatus 100 will be described hereinafter in detail with reference to FIG. 1. An uplink and a downlink have structures identical to each other except that their directions are different from each other. For simplifying the explanation, only the downlink will be described. The direction of an arrow shown in FIG. 1 is defined as the downlink direction. In the downlink direction, a WDM signal (an optical signal) is transmitted from the land terminal station.

The optical signal is input from the optical fiber 101 to the gain equalization apparatus 100. Under the control of the control unit 20, it is determined whether the input optical signal passes through the first path 1 or the second path 2 by the optical switch 10a. In the initial setting, the path is set so that the input optical signal passes through the first path 1 including the gain equalizer that corrects the tilt of the input optical signal.

When the optical loss in the submarine cable system is increasing, the control unit 20 receives a command from the land terminal station and controls the switching of the optical switches 10. The optical switch 10a switches the path from the first path 1 to the second path 2 under the control of the control unit 20. Note that the optical switch 10b also switches the path from the first path 1 to the second path 2 in a similar manner. The optical signal passes through the second path 2, is input to the optical switch 10b, and is output to the optical fiber 102.

By having the above-described configuration, the gain equalization apparatus 100 can suppress, when the optical loss in the submarine cable system increases, the increase in the optical loss caused by the gain equalization apparatus 100 by switching the path to the second path 2 including the through-fiber.

For example, while the optical loss caused by the gain equalizer is about 4 dB, the loss caused by the through-fiber is extremely small. Therefore, the gain equalization apparatus 100 can compensate for the increase in the loss by about 4 dB by switching the path from the first path 1 including the gain equalizer to the second path 2 including the through-fiber, and thereby can suppress the increase in the optical loss in the submarine communication system.

Further, since the gain equalization apparatus 100 is composed of only the first path 1, the second path 2, the optical switches 10, and the control unit 20, it is possible to construct it by using sufficiently-reliable devices for a submarine communication system. Therefore, it is possible to reduce the cost for pulling out the gain equalization apparatus 100 from the seabed in order to repair it and laying it on the seabed again. Further, since the configurations of the optical circuit and electrical circuit of the gain equalization apparatus 100 can be simplified, the size and power consumption of the gain equalization apparatus 100 can be reduced. The gain equalization apparatus 100 according to this example embodiment can reduce the power consumption and suppress the increase in the optical loss while improving the reliability.

Second Example Embodiment

FIG. 2 is a block diagram showing a configuration of a gain equalization apparatus 200 according to a second example embodiment. The gain equalization apparatus 200 includes a first path 1 including a gain equalizer, a second path 2 including a through-fiber, a third path 3 including a gain equalizer, an optical switch 11a, an optical switch 11b, and a control unit 20. An optical fiber 101 and an optical fiber 102 are connected to the gain equalization apparatus 200. Note that the optical switches 11a and 11b are also referred to collectively as optical switches 11. Reference numerals similar to those for the gain equalization apparatus 100 according to the first example embodiment are assigned to components similar to those of the gain equalization apparatus 100. Further, detailed descriptions of same contents as in the first example embodiment will be omitted as appropriate. The following description will be given with a particular emphasis on the differences from the first example embodiment.

The third path 3 is a path including a gain equalizer that corrects the tilt of an input optical signal. For example, the gain equalizer in the third path 3 may be identical to that in the first path 1. In this case, even when the gain equalizer in the first path 1 has failed, the gain equalization apparatus 200 can correct the tilt of an input optical signal in a similar manner by switching the path to the third path 3.

Alternatively, the gain equalizer in the third path 3 may be different from that in the first path 1. That is, the gain equalizer in the third path 3 may be able to correct a tilt level different from the tilt level to be corrected by the gain equalizer in the first path 1. In this way, the gain equalization apparatus 200 can correct the tilt level as required by switching the path. For simplifying the explanation, the following description will be given on the assumption that the gain equalizers in the first and third paths 1 and 3 are identical to each other.

The optical switches 11 are optical switches that can switch the path to one of the first, second and third paths 1, 2 and 3. Like the first example embodiment, the optical switches 11 switch the path under the control of the control unit 20.

For simplifying the explanation, the following description will be given on the assumption that the first path 1 has been selected as the initial setting. The gain equalization apparatus 200 can switch the path from the first path 1 to the third path 3 when the optical loss in the submarine cable system is increasing. In this way, for example, when the gain equalizer in the first path 1 has failed or malfunctioned, and hence the optical loss in the first path 1 is increasing, the gain equalization apparatus 200 can continuously correct the inclination of the optical signal while suppressing the increase in the optical loss in the submarine cable system by switching the path to the third path 3.

Further, the gain equalization apparatus 200 can switch the path from the first path 1 to the second path 2 when the optical loss in the submarine cable system is increasing. In this way, the gain equalization apparatus 200 can suppress the increase in the optical loss in the submarine cable system.

Note that the gain equalization apparatus 200 may switch the path from the third path 3 to the second path 2 when the optical loss in the submarine cable system is increasing.

As described above, the gain equalization apparatus 200 can suppress the increase in the optical loss in the submarine cable system by switching the path to one of the first, second and third paths 1, 2 and 3.

Operations performed by the gain equalization apparatus 200 will be described with reference to FIG. 2. An uplink and a downlink have structures identical to each other except that their directions are different from each other. For simplifying the explanation, only the downlink will be described. The direction of an arrow shown in FIG. 2 is defined as the downlink direction. In the downlink direction, a WDM signal is transmitted from a land terminal station.

An optical signal is input from the optical fiber 101 to the gain equalization apparatus 200. Under the control of the control unit 20, it is determined which of the first, second and third paths 1, 2 and 3 the input optical signal passes through by the optical switch 11*a*. As the initial setting, the optical switches 11 may be connected to the first path 1 or the third path 3, both of which include a gain equalizer that corrects the tilt of an input optical signal. The following description will be given on the assumption that the first path 1 has been selected as the initial setting.

When the optical loss in the submarine cable system is increasing, the control unit 20 receives a command from a land terminal station and controls the switching of the optical switches 11. The optical switch 11*a* switches the path from the first path 1 to the second path 2 or the third path 3 under the control of the control unit 20. Note that like optical switch 11*a*, the optical switch 11*b* also switches the path from the first path 1 to the second path 2 or third path 3 in a similar manner. The optical signal passes through the second path 2 or the third path 3 and is output to the optical fiber 102 through optical switch 11*b*.

When the optical loss has increased because of the insertion of an alternative cable due to the aged deterioration or repair of the optical fiber 101, the gain equalization apparatus 200 may switch the optical switches 11 so that the WDM signal passes through the second path 2 including the through-fiber. Further, for example, when the optical loss has increased due to the gain equalizer in the first path 1, the gain equalization apparatus 200 may switch the optical switches 11 so that the signal passes through the second path 2 or the third path 3.

As described above, the gain equalization apparatus 200 can suppress the increase in the optical loss in the submarine cable system by switching the path to one of the first, second and third paths 1, 2 and 3.

The gain equalization apparatus 200 has a simple configuration composed of the first path 1, the second path 2, the third path 3, the optical switches 11, and the control unit 20, so that its size can be reduced. Further, by reducing the size, the need for a complicated control mechanism can be eliminated, so that the power consumption can be reduced. In addition, since the gain equalization apparatus 200 can be constructed with a simple structure, the possibility of failures and malfunctions are reduced, thus making it possible to improve the reliability.

Note that another path(s) including a gain equalizer(s) may be newly added to the gain equalization apparatus 200. In this way, the occurrences of failures and malfunctions in the gain equalization apparatus 200 can be further reduced, so that the cost for pulling up the gain equalization apparatus 200 for repairs or the like and laying it on the seabed again can be further reduced.

Third Example Embodiment

FIG. 3 is a block diagram showing a configuration of a gain equalization system 1000 according to a third example embodiment. The gain equalization system 1000 includes a gain equalization apparatus 200 and a gain equalization apparatus 300. Since the configuration of the gain equalization apparatus 200 is similar to that of the gain equalization apparatus 200 according to the second example embodiment, similar reference numerals are assigned to similar components, and detailed descriptions thereof will be omitted as appropriate. Further, the following description will be given with a particular emphasis on the differences from the second example embodiment. Note that the gain equalization apparatus 100 may be used in place of the gain equalization apparatus 200.

The gain equalization apparatus 300 is disposed in a land terminal station. The gain equalization apparatus 300 is a gain equalization apparatus including a fourth path 4 including a gain equalizer that corrects the tilt of an input optical signal. The gain equalizer included in the gain equalization apparatus 300 may be identical to or different from the gain equalizer in the first path 1 or the third path 3.

As shown in FIG. 3, an optical signal output from the optical fiber 102 is input to the gain equalization apparatus 300. Note that the optical signal output from the optical fiber 102 may pass through a repeater(s) or another gain equalization apparatus(es) before being input to the gain equalization apparatus 300.

The gain equalizer in the fourth path 4 of the gain equalization apparatus 300 corrects the tilt of an optical signal output from the second path 2 when the second path 2 of the gain equalization apparatus 200 is used.

For example, there are cases in which the gain equalization apparatus 200 is using the second path 2, and the increase in the optical loss is suppressed compared to when the first path 1 or the third path 3 is used, but the optical loss of the optical signal input from the optical fiber 101 still occurs, and hence it is necessary to correct the tilt level. The gain equalization apparatus 300 corrects the tilt of the optical signal output from the gain equalization apparatus 200, so that the transmission quality can be ensured.

Note that like the gain equalization apparatuses 100 and 200, the gain equalization apparatus 300 may further include a path including a through-fiber and an optical switch. The gain equalization apparatus 300 may output, when the first path 1 or the third path 3 of the gain equalization apparatus 200 is used, the optical signal input from the optical fiber 102 to the path including the through-fiber because there is no need to correct the tilt.

As described above, in the gain equalization system 1000 according to the third example embodiment, since the fourth path 4 including the gain equalizer is provided in the land terminal station, it is possible to, even when the tilt of an optical signal is not corrected by the gain equalization apparatus 200 laid on the seabed, correct the tilt of the optical signal in the land terminal station. In this way, it is possible to ensure the transmission quality of the optical signal in the submarine cable system.

An example of a hardware configuration for the control apparatuses of the gain equalization apparatuses 100, the gain equalization apparatuses 200 and the gain equalization apparatuses 300 according to the first to third example embodiments will be explained with reference to FIG. 4. In FIG. 4, each of the gain equalization apparatuses 100, the gain equalization apparatuses 200 and the gain equalization apparatuses 300 have a processor 111 and a memory 112. The processor 111 may be, for example, a microprocessor, an MPU (Micro Processing Unit), or a CPU (Central Processing Unit). The processor 111 may include a plurality of processors. The memory 112 is composed of a combination of a volatile memory and a nonvolatile memory. The memory 112 may include a storage disposed remotely from the processor 111. In this case, the processor 111 may access the memory 112 through an input/output interface (not shown).

Further, the control apparatus in the above-described example embodiments may be formed by software, hardware, or both of them. Further, the control apparatus may be formed by one hardware device or one software program, or a plurality of hardware devices or a plurality of software programs. Each function of the control apparatuses in the above-described example embodiments may be implemented by a computer. For example, a program for performing operations in an example embodiment may be stored in the memory 112, and each function may be implemented by having the processor 111 execute the program stored in the memory 112.

Such programs can be stored and supplied to the computer by using various types of non-transitory computer readable media. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, a CD-R/W, and a semiconductor memory (such as a mask ROM, a PROM (Programmable ROM), an EPROM (Erasable PROM), a flash ROM, and a RAM (random access memory)). Further, the programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line such as an electric wire and an optical fiber or a wireless communication line.

Note that the present invention is not limited to the above example embodiments, and they can be modified as appropriate without departing from the scope and spirit of the invention.

This application is based upon and claims the benefit of priority from Japanese patent application No. 2021-050010, filed on Mar. 24, 2021, the disclosure of which is incorporated herein in its entirety by reference.

REFERENCE SIGNS LIST

1 FIRST PATH
2 SECOND PATH

10

3 THIRD PATH
4 FOURTH PATH
10, 10A, 10B, 11, 11A, 11B OPTICAL SWITCH
20 CONTROL UNIT
100, 200, 300 GAIN EQUALIZATION APPARATUS
101 OPTICAL FIBER
102 OPTICAL FIBER
111 PROCESSOR
112 MEMORY
1000 GAIN EQUALIZATION SYSTEM

What is claimed is:

1. A gain equalization system comprising:
a first gain equalization apparatus; and
a second gain equalization apparatus, wherein,
the first gain equalization apparatus comprises:
    a first path including a gain equalizer configured to correct a tilt of an input optical signal;
    a second path including a through-fiber configured to transmit the input optical signal therethrough as it is;
    an optical switch capable of switching between the first path including the gain equalizer and the second path including the through-fiber;
    at least one memory configured to store instructions; and
    at least one processor configured to execute the instructions to control the switching of the optical switch, and
the second gain equalization apparatus comprises a fourth path including a gain equalizer configured to correct a tilt of an input optical signal in a land terminal station, wherein the gain equalizer in the fourth path corrects a tilt of an optical signal output from the second path in a case where the second path is used.

2. The gain equalization system according to claim 1, wherein the first gain equalization apparatus further comprises a third path including a gain equalizer configured to correct a tilt of an input optical signal, and
the optical switch is capable of switching a path to one of the first path, the second path, and the third path.

3. The gain equalization system according to claim 1, wherein the at least one processor is configured to execute the instructions to control the switching of the optical switch based on a command received from the land terminal station.

4. The gain equalization system according to claim 1, wherein the first gain equalization apparatus is laid on a seabed.

5. A method performed by a second gain equalization apparatus connected to a first gain equalization apparatus via an optical fiber, comprising:
performing a gain equalization process for correcting a tilt of an input optical signal, and outputting the resultant signal; and
outputting, in a predetermined case, the input optical signal as it is without performing the gain equalization process, wherein
the first gain equalization apparatus comprises a first path including a gain equalizer configured to correct a tilt of an input optical signal, a second path including a through-fiber configured to transmit the input optical signal as it is, and an optical switch capable of switching between the first path and the second path, and
the second gain equalization apparatus comprises a fourth path provided in a land terminal station and including a gain equalizer configured to correct a tilt of an input optical signal output from the optical fiber, and wherein the gain equalizer in the fourth path corrects a tilt of an optical signal output from the second path in a case where the second path is used.

6. A non-transitory computer readable medium storing a program for causing a computer provided in a second gain equalization apparatus connected to a first gain equalization apparatus via an optical fiber, to execute the following processing of:

performing a gain equalization process for correcting a tilt of an input optical signal, and outputting the resultant signal; and outputting, in a predetermined case, the input optical signal as it is without performing the gain equalization process, wherein the first gain equalization apparatus comprises a first path including a gain equalizer configured to correct a tilt of an input optical signal, a second path including a through-fiber configured to transmit the input optical signal as it is, and an optical switch capable of switching between the first path and the second path, and the second gain equalization apparatus comprises a fourth path provided in a land terminal station and including a gain equalizer configured to correct a tilt of an input optical signal output from the optical fiber, and wherein the gain equalization process causes the gain equalizer in the fourth path to correct a tilt of an optical signal output from the second path in a case where the second path is used.

* * * * *